US007046663B1

(12) United States Patent
Temoshenko et al.

(10) Patent No.: US 7,046,663 B1
(45) Date of Patent: May 16, 2006

(54) SYSTEM AND METHOD FOR INTERCEPTING PACKETS IN A PIPELINE NETWORK PROCESSOR

(75) Inventors: Leo Temoshenko, Raleigh, NC (US); Hugh Nhan, Cary, NC (US); Charles M. Parker, Apex, NC (US); Robert L. King, Garner, NC (US); Jonathan D. Douglas, Sanford, NC (US); Nathan A. Mitchell, Siler City, NC (US); George R. Everhart, Apex, NC (US); Douglas W. Currie, Raleigh, NC (US)

(73) Assignee: Cisco Technology, Inc., San Jose, CA (US)

( * ) Notice: Subject to any disclaimer, the term of this patent is extended or adjusted under 35 U.S.C. 154(b) by 958 days.

(21) Appl. No.: 09/932,490

(22) Filed: Aug. 17, 2001

(51) Int. Cl.
*H04L 12/28* (2006.01)
*H04M 1/24* (2006.01)
*H04M 1/64* (2006.01)

(52) U.S. Cl. .......................... 370/390; 379/35; 379/85
(58) Field of Classification Search ................. 370/389, 370/390, 392; 379/35, 85
See application file for complete search history.

(56) References Cited

U.S. PATENT DOCUMENTS

| 5,444,782 | A | 8/1995 | Adams, Jr. et al. |
| 5,572,528 | A | 11/1996 | Shuen |
| 5,987,611 | A | 11/1999 | Freund |
| 6,061,349 | A * | 5/2000 | Coile et al. ................. 370/389 |
| 6,321,336 | B1 * | 11/2001 | Applegate et al. .......... 713/201 |
| 6,335,930 | B1 * | 1/2002 | Lee ............................. 370/387 |
| 6,473,406 | B1 | 10/2002 | Coile et al. |
| 6,529,515 | B1 * | 3/2003 | Raz et al. .................... 370/401 |
| 6,678,270 | B1 * | 1/2004 | Garfinkel .................... 370/392 |
| 6,707,818 | B1 * | 3/2004 | Kadambi et al. ........... 370/391 |
| 6,754,834 | B1 | 6/2004 | Miettinen et al. |
| 6,839,349 | B1 * | 1/2005 | Ambe et al. ................ 370/390 |
| 6,862,282 | B1 * | 3/2005 | Oden .......................... 370/394 |
| 6,925,082 | B1 | 8/2005 | Buhrke et al. |
| 2002/0004819 | A1 * | 1/2002 | Agassy et al. .............. 709/203 |
| 2002/0009079 | A1 * | 1/2002 | Jungck et al. .............. 370/389 |
| 2002/0009973 | A1 * | 1/2002 | Bondy et al. .............. 455/67.2 |
| 2002/0054595 | A1 * | 5/2002 | Ambe et al. ................ 370/390 |
| 2002/0101867 | A1 * | 8/2002 | O'Callaghan et al. ...... 370/389 |
| 2002/0196785 | A1 * | 12/2002 | Connor ....................... 370/392 |
| 2003/0012196 | A1 * | 1/2003 | Ramakrishnan ............. 370/390 |
| 2004/0199670 | A1 * | 10/2004 | Garfinkel .................... 709/246 |

* cited by examiner

*Primary Examiner*—Hassan Kizou
*Assistant Examiner*—Hong Sol Cho
(74) *Attorney, Agent, or Firm*—Baker Botts L.L.P.

(57) ABSTRACT

In a pipeline network processor, a packet intercept feature determines whether a packet is to be intercepted based on the inbound and outbound port through which the packet travels and based on the source and destination of the packet. When a packet enters the pipeline network processor, a determination is made as to whether the inbound and outbound ports are enabled for packet intercept. If so, a source and/or destination media access control address is compared to a list of configured intercept addresses. If a match is found, a copy of the packet is diverted to an intercept receiver and the original packet is forwarded to its intended destination.

21 Claims, 3 Drawing Sheets

UPSTREAM PORT CONFIGURATION
COLUMN-0 OM_Fp_FEATURE_DATA

| VCC1 | IP ADDRESS | FLAGS | MC | FIB |
|---|---|---|---|---|
| 0 | 1,1,1,1 | INTERCEPT_ON | 2 | 6 |
| 1 | 1,1,1,2 | INTERCEPT_OFF | 3 | 1 |
| 2 | 2,2,2,1 | INTERCEPT_ON | 7 | 8 |

DOWNSTREAM PORT CONFIGURATION
COLUMN-1 COL_1_CICb_OUT

| VCC1 | PMAP | MC_TTL | FLAGS |
|---|---|---|---|
| 0 | 1 | 6 | INTERCEPT_ON |
| 1 | 4 | 9 | INTERCEPT_OFF |
| 2 | 0 | 3 | INTERCEPT_ON |

SYSTEM AND METHOD FOR INTERCEPTING PACKETS IN A PIPELINE NETWORK PROCESSOR

TECHNICAL FIELD OF THE INVENTION

The present invention relates in general to voice over Internet Protocol technology and more particularly to a system and method for intercepting packets in a pipeline network processor.

BACKGROUND OF THE INVENTION

Pipeline network processors are designed to forward Internet Protocol (IP) packets at an extremely high data rate in excess of two million packets per second. Pipeline network processors typically have a limited number of instruction cycles and memory to perform the applicable task. Implementing features or functions that do not fit the traditional packet forwarding model is a challenging endeavor and may have a negative impact on normal packet forwarding functions such as packet filtering and quality of service processing.

One of the seldom used features in a pipeline network processor is a wiretap or packet intercept function. Packet intercept provides support for a basic wiretap facility for voice over IP (VoIP) calls that is required by the United States Federal Communications Assistance for Law Enforcement Act. The wiretap facility is based on the Media Access Control (MAC) address of the customer premises equipment end user device. In a an environment that does not use a pipeline network processor, the source MAC address in the received packet is used to compare against the configured intercept MAC address list. For a packet being sent to a port, the packet's destination MAC address is used to compare against the configured intercept MAC address list. When a matching MAC address is found, a copy of the packet is encapsulated into a User Datagram Protocol (UDP) packet which is sent to a specified server at a given IP and port address.

Intercepting packets received from a port is a relatively simple operation in systems that use a central processing engine and not a pipeline network processor. The received packet contains the source MAC address needed for the comparison. However, processing of a received packet in a pipeline network processor is not necessarily a simple operation due to the limited instruction cycle available. Moreover, intercepting packets sent to a port is extremely difficult in a pipeline network processor. The destination MAC address for the comparison is not in the packet but rather in the outbound Layer 2 encapsulation. The packet's payload is appended to the outbound Layer 2 encapsulation just prior to being forwarded to the network media. At this point, it is too late to perform additional processing in the pipeline network processor for MAC address comparisons. Without major restructuring of the packet forwarding path, interception cannot be accomplished in a pipeline network processor. Therefore, it is desirable to perform packet intercept processing in a pipeline network processor without requiring major restructuring of the packet forwarding path.

SUMMARY OF THE INVENTION

From the foregoing, it may be appreciated by those skilled in the art that a need has arisen for effectively intercepting packets in a pipeline network processor without adversely affecting the packet forwarding path. In accordance with the present invention, a system and method for intercepting packets in a pipeline network are provided that substantially eliminate or greatly reduce disadvantages and problems associated with conventional packet intercept techniques.

According to an embodiment of the present invention, there is provided a method of intercepting packets in a pipeline network processor that includes receiving an information packet from an inbound port. An outbound port for the information packet is then determined. A check is made to see if the outbound port has been identified for intercept processing. An identity of a destination is placed into the information packet. In response to the outbound port being identified for intercept processing, a determination is made as to whether the destination has been identified for intercept processing. A copy of the information packet is made in response to the destination being identified for intercept processing.

The present invention provides various technical advantages over conventional packet intercept techniques. For example, one technical advantage is to provide a packet intercept capability in a pipeline network processor. Another technical advantage is having minimal impact on normal packet forwarding operations and no restructuring of the pipeline network processor in order to provide the intercept feature. Yet another technical advantage is to avoid impacting the limited memory resources in the pipeline network processor. Still another technical advantage is to provide an intercept feature for similar and dis-similar inbound and outbound network media. Other technical advantages may be readily ascertainable by those skilled in the art from the following figures, description, and claims.

BRIEF DESCRIPTION OF THE DRAWINGS

For a more complete understanding of the present invention and the advantages thereof, reference is now made to the following description taken in conjunction with the accompanying drawings, wherein like reference numerals represent like parts, in which.

DETAILED DESCRIPTION OF THE INVENTION

Figure 1:
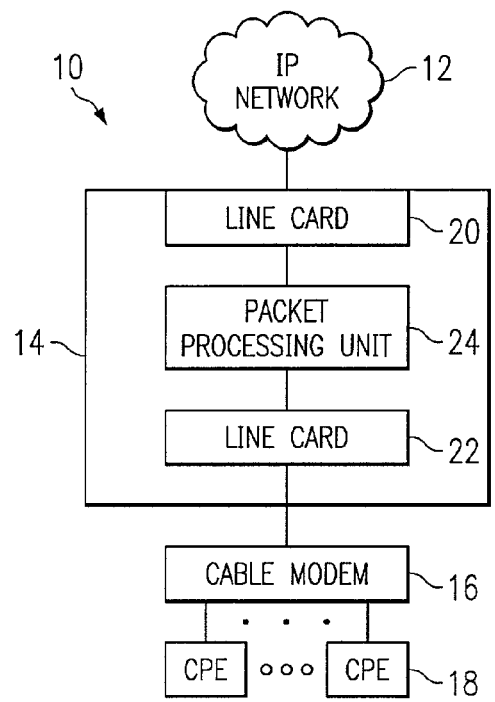
FIG. 1 illustrates a simplified block diagram of a packet processing and distribution network.

FIG. 1 is a simplified block diagram of a packet processing and distribution network 10. Network 10 includes an Internet Protocol network 12, a cable modem termination system 14, a cable modem unit 16, and a plurality of customer premises equipment 18. Cable modem termination system 14 includes a line card 20 to interface with Internet Protocol network 12, a line card 22 to interface with cable modem unit 16, and a packet processing unit 24.

Figure 2:
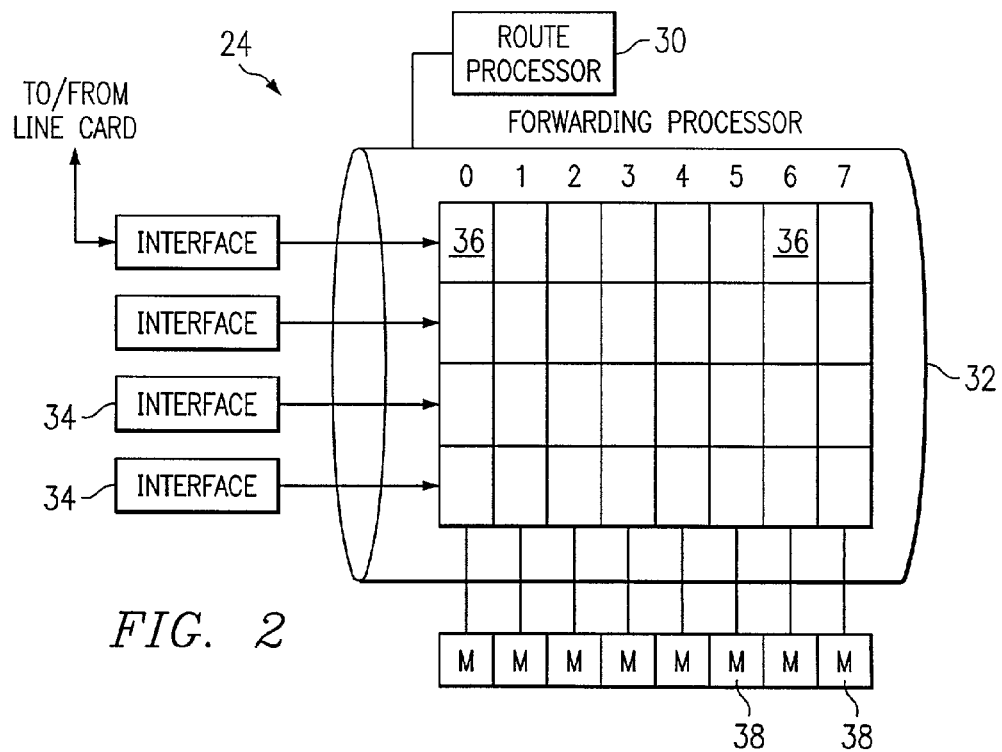
FIG. 2 illustrates a simplified block diagram of a pipeline network processor in the packet processing and distribution network.

FIG. 2 is a simplified block diagram of packet processing unit 24. Packet processing unit 24 includes a route processor 30, a forwarding processor 32, and a plurality of interface units 34. Interface units 34 receive and transmit packets from and to line cards 20. Route processor 30 performs initializing of forward processor 32 and setting/updating of feature and forwarding tables in forwarding processor 32. Route processor 30 may process certain packets diverted from forwarding processor 32. Route processor 30 may also inject packets into forwarding processor 32 for transfer to interface units 34 and line cards 20. Among other functions, injected packets may provide results for diverted packets and route updates. Forwarding processor 32 is a pipeline network processor that receives packets, performs fast path switching, feature enforcement, and packet forwarding. Packets may be unicast having one destination or multicast having multiple destinations. Unicast and multicast packets follow separate forwarding paths through forwarding processor 32.

Forwarding processor 32 includes eight processing columns 36. Each processing column 36 has 128 instruction cycles to perform packet processing before control is passed to the next processing column 36. If a processing column 36 does not complete its processing of a packet within the 128 instruction cycle, the packet is fed back to the processing column 36 for subsequent processing. Each processing column 36 includes a memory 38 to store tables used in the processing of a packet. Each memory 38 may be partitioned into a slow access memory and a fast access memory with varying amount of memory space.

Each processing column 36 performs a distinct processing function within forwarding processor 32. Column 0 performs initial identification and classification of a packet received from interface units 34. Column 1 performs a route lookup in order to properly forward the packet. Column 2 performs access control list processing to determine if the packet is allowed to be received and allowed to be forwarded. Column 3 performs input quality of service processing on the packet. Column 4 performs output quality of service processing on the packet and IP fragmentation if the packet length exceeds a desired output size. Column 5 performs MAC address rewriting. Column 6 performs output queuing of the packet. Column 7 performs output forwarding of the packet. For normal forwarding, a packet is identified and classified in Column 0 and a route for the packet is identified in Column 1. Input access control list processing is performed in Column 2 followed by input quality of service processing in Column 3. The packet returns to Column 2 for output access control list processing and is passed by Column 3 to Column 4 for output quality of service processing. Column 5 performs the MAC address rewrite and Column 6 places the packet in an output queue. Column 7 then forwards the packet towards its destination.

Forwarding processor 32 has a capability to perform a packet intercept function by comparing MAC addresses of packets received from upstream ports and sent to downstream ports. If a match is found, forwarding processor 32 diverts a copy of the originally received packet to route processor 30 for transfer to an intercept receiver. Alternatively, forwarding processor 32 may generate an intercept packet from the originally received packet for transfer to an intercept receiver. Inbound MAC address comparisons are performed after input access control list processing. Outbound MAC address comparisons are performed after output access control list processing. Since intercept processing is based on MAC addresses, interception of data or digitized voice packets may occur.

Figures 3, 4, 5:
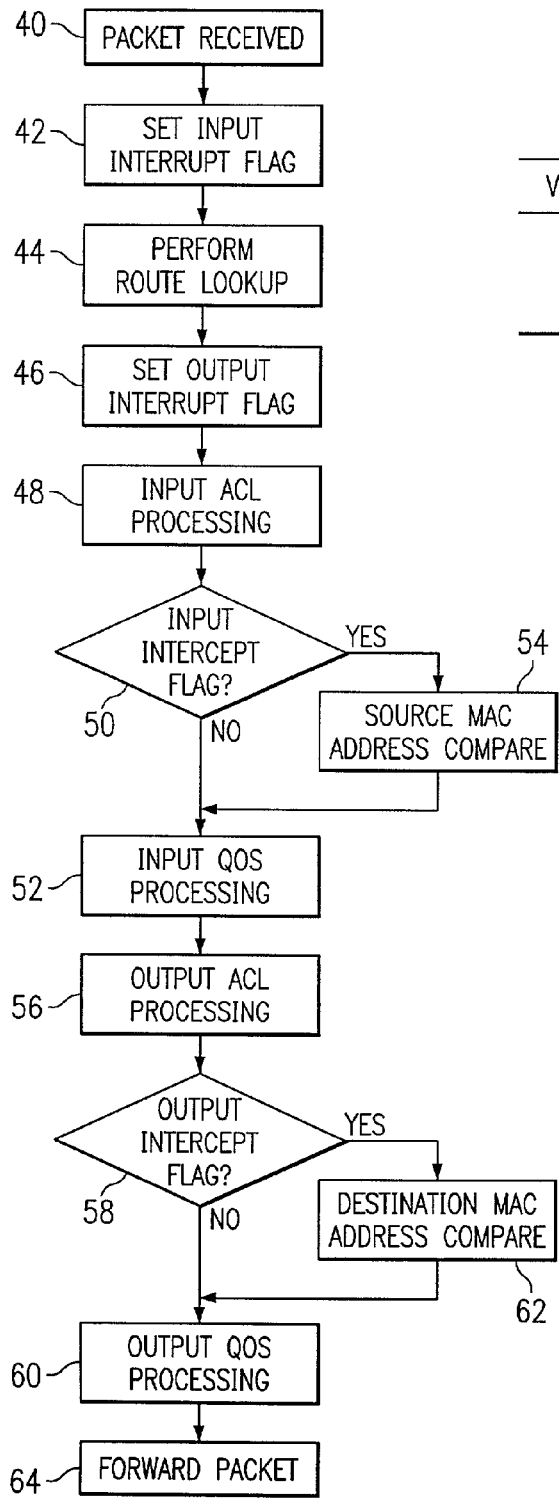
FIG. 3 illustrates a simplified logic flow diagram of packet intercept processing performed by the pipeline network processor.
FIG. 4 illustrates a table used in the pipeline network processor to enable inbound packet interception.
FIG. 5 illustrates a table used in the pipeline network processor to enable outbound packet interception.

FIG. 3 shows a flow diagram of the packet intercept process performed by forwarding processor 32. Initially, forwarding processor 32 receives a packet from a line card 20 through interface unit 34 at step 40. Forwarding processor 32 in Column 0 will determine whether the input port that the packet was received from is enabled for intercept processing.

Column 0 includes a table to indicate whether or not the packet intercept feature is enabled for an upstream port. FIG. 4 shows an example of an input port configuration table indicating the enablement of the packet intercept feature. If enabled, an input intercept flag is set in the packet at step 42. The packet is then passed to Column 1 at step 44 to determine an outbound route for the packet. Forwarding processor 32 then determines whether the outbound port has been enabled for intercept processing.

Column 1 includes a table to indicate whether the packet intercept feature is enabled for a downstream port. FIG. 5 shows an example of an output port configuration table indicating the enablement of the packet intercept feature. If enabled, an output intercept flag is set in the packet at step 46 and the destination MAC address is stored in the packet. The packet then goes through input access control list processing in Column 2 at step 48.

Figure 6:
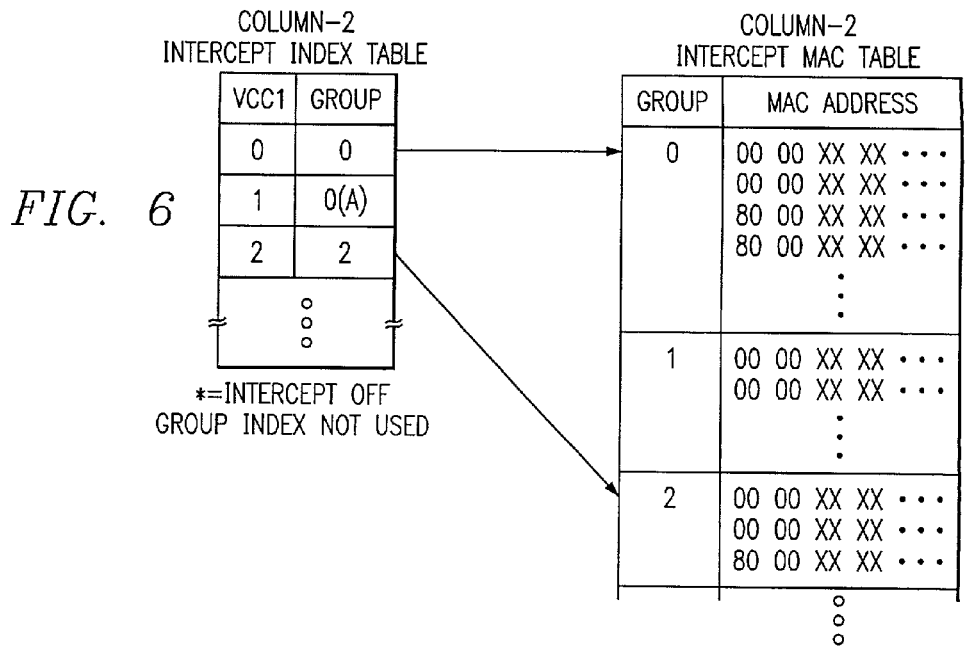
FIG. 6 illustrates a group index table and a configured intercept address table used by the pipeline network processor for address comparisons.

After input access control list processing is performed, a determination is made as to whether the input intercept flag has been set at step 50. If not, the packet proceeds to input quality of service processing in Column 3 at step 52. If so, then a MAC address comparison is performed at step 54 to determine whether or not the packet is to be intercepted. Column 2 includes a table of configured intercept MAC addresses for each upstream and downstream port. Configured intercept MAC addresses may be grouped on a per port basis and accessed through an index table. An example of table indexing in Column 2 is shown in FIG. 6. After the MAC address comparison, the packet is passed to input quality of service processing in Column 2 at step 52.

After input quality of service processing is performed, the packet is fed back to Column 2 for output access control list processing at step 56. After output access control list processing is performed, a determination is made at step 58 whether the output intercept flag has been set. If not, the packet is forwarded to output quality of service processing in Column 4 at step 60. If the output intercept flag is set, the packet is passed on for MAC address comparison at step 62 before returning to output quality of service processing. After output quality of service processing, the packet is forwarded through Columns 5–7 for transfer from a line card 20.

Figure 7:
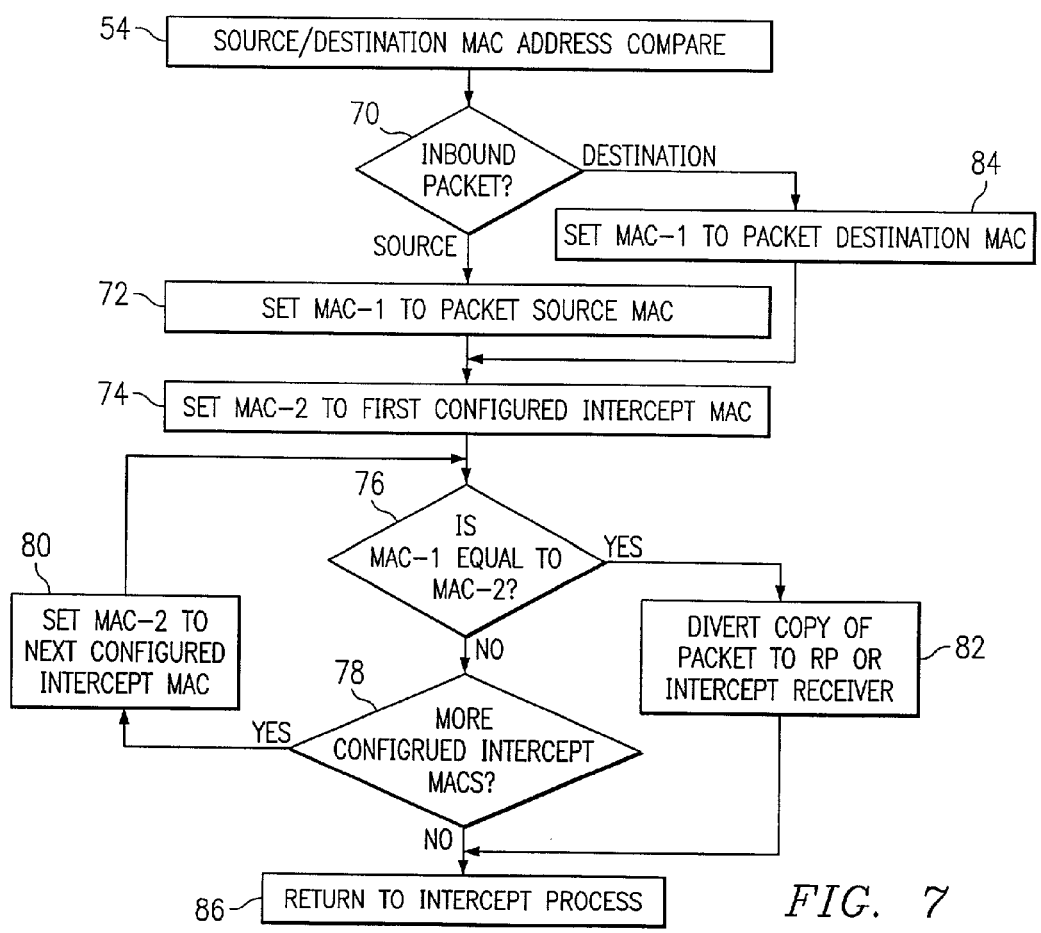
FIG. 7 illustrates a simplified flow diagram of source and destination address comparisons of packets identified for intercept processing.

FIG. 7 shows the MAC address comparison performed by forwarding processor 32. Upon entering MAC address comparison, a determination is made at step 70 as to whether the packet has its input or output intercept flags set. For input intercept flags, a first buffer is loaded at step 72 with the source MAC address from the packet. A second buffer is loaded at step 74 with an intercept MAC address from a configured intercept MAC address table. A comparison of the first and second buffer is performed at step 76. If there is no match, a determination is made at step 78 as to whether there are more configured intercept MAC addresses in the table. If not, then the packet is forwarded to input quality of service processing at step 52. If so, the next configured intercept MAC address in the table is loaded into the second buffer at step 80 and the comparison of step 76 is performed again. This comparison loop will continue until there is a match or none of the configured intercept MAC addresses in the table match the source MAC address of the packet. If there is a match, a copy of the packet is diverted at step 82 to route processor for transfer to an intercept receiver or an intercept packet is generated by forwarding processor 32 for transfer to the intercept receiver as desired. The original packet is then further processed through forwarding processor 32. Forwarding processor 32 works similarly when the output intercept flag is set. The only difference is that the first buffer is loaded at step 84 with the destination MAC address for the packet before the comparisons are performed.

The packet intercept feature may be implemented within forwarding processor 32 using inbound detection processing, outbound detection processing, common compare processing, and common final processing routines. TABLE 1 shows the performance of the inbound and outbound detection processing routines according to each processing column 36 in forwarding processor 32.

TABLE 1

| Column | Inbound Detection Processing | Outbound Detection Processing |
|---|---|---|
| 0 | Receive Packet from a Line Card<br>If Packet Intercept on vcci_in is ON<br>Set PI_IN bit in Packet<br>PDONE(FIB - unicast)<br>or<br>PDONE (MFIB - multicast) | |
| 1 | Route Lookup (FIB or MFIB or TFIB)<br>If Packet Intercept on vcci_out is ON<br>Set PI_OUT in Packet<br>PDONE(INPUT_ACL) | |
| 2 | Perform Input ACL<br>IF PI_IN is ON<br>PDONE(PKT_INTERCEPT)<br>Else<br>PDONE(INPUT_QOS) | Perform Output ACL<br>If PI_OUT is ON<br>PDONE(PKT_INTERCEPT)<br>Else<br>PDONE(OUTPUT_QOS) |
| 3 | PKT_INTERCEPT Path<br>Feedback Setup<br>(pkt_type, pkt_direction)<br>Save Context Bytes<br>PDONE(PKT_INTERCEPT) | PKT_INTERCEPT Path<br>Feedback Setup<br>(pkt_type, pkt_direction)<br>Save Context Bytes<br>PDONE(PKT_INTERCEPT) |
| 4 | PKT_INTERCEPT Path<br>Pass Packet<br>PDONE(PKT_INTERCEPT) | PKT_INTERCEPT Path<br>Pass Packet<br>PDONE(PKT_INTERCEPT) |
| 5 | PKT_INTERCEPT Path<br>Copy Source MAC Address to compare area in Packet<br>PDONE(PKT_INTERCEPT) | PKT_INTERCEPT Path<br>Lookup Destination MAC Address<br>Copy Destination MAC Address to compare area in Packet<br>PDONE(PKT_INTERCEPT) |
| 6. | PKT_INTERCEPT Path<br>Pass Packet<br>PDONE(PKT_INTERCEPT) | PKT_INTERCEPT Path<br>Pass Packet<br>PDONE(PKT_INTERCEPT) |
| 7. | PKT_INTERCEPT Path<br>Packet Moves from IPM to SDRAM - if not done yet<br>Packet Feedback to Column- 0 on PKT_INTERCEPT Path | PKT_INTERCEPT Path<br>Packet Moves from IPM to SDRAM if not done yet<br>Packet Feedback to Column -0 on PKT_INTERCEPT Path |

For the inbound detection processing routine, Column 0 receives a packet from source port 1 along a normal path and sets the input intercept flag in the packet if port 1 is enabled for packet intercept. The packet is then forwarded to Column 1 for route lookup to identify a destination port 2. Column 1 will also set the output intercept flag in the packet if port 2 is enabled for packet intercept. The packet is then passed to Column 2 where input access control list processing is performed, including any necessary feedbacks. Column 2 will check for the setting of the input intercept flag in the packet. If the flag has not been set, the packet will proceed to Column 3 along the normal path for input quality of service processing. If the flag has been set, the packet will proceed along an intercept path to Column 3.

Along the intercept path, Column 3 performs feedback setup processing for the packet intercept feature. Feedback setup processing includes setting the packet type and packet direction. The packet direction is set to INBOUND. The packet type is set to either UNICAST or MULTICAST. Unicast packets have one destination while multicast packets have more than one destination. A number of packet bytes are saved in memory 38 of Column 3 since the packet intercept feature performs some overwriting of packet bytes. After feedback setup processing, the packet is transferred on the intercept path to Column 4 and then Column 5. Column 5 inserts a MAC address associated with the packet source into the packet. The packet continues along the intercept path through Column 6 to Column 7. At Column 7, the packet is fed back to Column 0 on the intercept path in order to perform the common compare processing.

Outbound detection processing may be entered for packets from input quality of service processing in Column 3 that do not have a set input intercept flag or that have already been intercept processed. Output access control list processing is then performed at Column 2 and a determination is made as to whether the output intercept flag is set. If not, the packet proceeds to Column 4 along the normal path for output quality of service processing. If the output intercept flag is set, the packet is forwarded along the intercept path to Column 3 for feedback setup processing where this time the packet direction is set to OUTBOUND. Certain packet bytes are also saved as discussed above. After feedback setup processing, the packet is transferred on the intercept path to Column 4 and then Column 5. Column 5 determines and then inserts a destination MAC address associated with the packet destination into the packet. The packet continues along the intercept path through Column 6 to Column 7. At Column 7, the packet is fed back to Column 0 on the intercept path in order to perform the common compare processing.

TABLE 2 shows the performance of the common compare processing and final processing routines according to each processing column 36 in forwarding processor 32.

TABLE 2

| COLUMN | MAC Compare Processing | Final Processing |
|---|---|---|
| 0 | PKT_INTERCEPT Path<br>Pass Packet<br>PDONE(PKT_INTEREPT) | PKT_INTERCEPT_DONE<br>Path Pass Packet<br>PDONE(PKT_INTERCEPT_DONE) |
| 1 | PKT_INTERCEPT Path<br>Pass Packet<br>PDONE(PKT_INTERCEPT) | PKT_INTERCEPT_DONE Path<br>If bytes_restored is ON<br>Restore Temp Flags<br>PDONE (PKT_INTERCEPT_DONE) |

TABLE 2-continued

| COL-UMN | MAC Compare Processing | Final Processing |
|---|---|---|
| 2. | PKT_INTERCEPT Path<br>Compare MAC Address(es)<br>If found<br>Feedback Update<br>(intercepted = ON)<br>COPY Packet Setup<br>Else (not intercepted)<br>Feedback Update<br>(terminate = ON)<br>PDONE(PKT_INTERCEPT_<br>DONE) | PKT_INTERCEPT_DONE<br>Path<br>If bytes_restored is ON<br>Feedback Cleanup<br>If direction INBOUND<br>PDONE(INPUT_QOS)<br>Else PDONE(OUTPUT_QOS)<br>Else (intercepted packet)<br>Feedback Update<br>(terminate = ON)<br>PDONE(PKT_INTERCEPT_<br>DONE) |
| 3 | PKT_INTERCEPT_DONE<br>Path<br>If terminate is ON<br>Restore Context Bytes<br>Feedback Update<br>(bytes_restored = ON)<br>PDONE(PKT_INTERCEPT_<br>DONE) | INPUT_QOS Path<br>Or<br>OUTPUT_QOS Path<br>Or<br>PKT_INTERCEPT_DONE<br>Path |
| 4 | PKT_INTERCEPT_DONE<br>Path Pass Packet<br>PDONE(PKT_INTERCEPT_<br>DONE) | |
| 5 | PKT_INTERCEPT_DONE<br>Path Pass Packet<br>PDONE(PKT_INTERCEPT_<br>DONE) | |
| 6 | PKT_INTERCEPT_DONE<br>Path Pass Packet<br>PDONE(PKT_INTERCEPT_<br>DONE) | |
| 7 | Packet copied and copy<br>diverted to intercept<br>receiver if INTERCEPTED<br>Packet Feedback to<br>Column-0 on<br>PKT_INTERCEPT_DONE<br>Path | |

Common compare processing is performed in Column 2 on a feedback pass along the intercept path from either inbound detection processing or outbound detection processing. The packet passes through Columns 0 and 1 to Column 2 where the MAC address inserted into the packet is compared to the configured intercept MAC addresses in the table maintained in Column 2. If no match is found, a terminate flag is set, the packet is forwarded along an intercept complete path to Column 3 where the saved bytes are restored in the packet, and the packet is transferred through Columns 4–7 to common final processing. If a match is found, an intercepted flag is set, divert setup processing is performed, and the packet is forwarded along the intercept complete path through Columns 3–6 to Column 7 where a copy of the original packet is made and either diverted to route processor 30 or sent directly to the intercept receiver. the packet is then fed back on the intercept complete path to Column 0 for common final processing.

Common final processing is performed on a feedback pass from common compare processing. Common final processing is performed in one pass for packets which were not intercepted and in two passes for packets which were intercepted. At final processing, the packet is sent through Column 0 to Column 1 along the intercept complete path where a check is made to see if bytes were restored in the packet. If so, indicating that the packet was not intercepted, other flags are restored and the packet proceeds along the intercept complete path to Column 2 where feedback cleanup is performed. If the packet direction is INBOUND, the packet is then transferred on the normal path to input quality of service processing in Column 3. If the packet direction is OUTBOUND, the packet is then transferred along the normal path to output quality of service processing in Column 3. If packet bytes have not been restored, indicating that the packet was intercepted, the terminate flag is set in Column 2 and the bytes are restored in Column 3. The packet continues along the intercept complete path through Columns 4–7 and fed back to Column 0. In this last feedback path, the packet goes to either input or output quality of service processing as described above.

Forwarding processor 32 is able to intercept packets, especially outbound packets, without restructuring the pipeline network processor implementation or severely impacting other normal forwarding features. Forwarding processor 32 performs a look ahead into the outbound re-encapsulation Layer 2 header to find the needed destination MAC address for storage and subsequent comparison to reference destinations in an intercept list. The packet intercept technique in saving the MAC address in the packet for comparison by forwarding processor 32 operates regardless of whether the packet is received and sent over the same or different inbound and outbound media types. Thus, for example, forwarding processor 32 can handle packets to and from inbound and outbound Ethernet links or to and from inbound ATM and outbound Ethernet links and vice versa.

Unicast or multicast packets that are dropped during normal processing in forwarding processor 32 may be excluded from intercept processing. A packet is dropped if the format of the packet has problems or if the route cannot be determined. These packets may be diverted to route processor 30 for further handling. Unicast and multicast packets that are normally diverted to route processor 30 or injected therefrom may also be excluded from intercept processing to avoid sending and receiving duplicate copies of packets between route processor 30 and forwarding processor 32. For these exclusions, route processor 30 may be configured to handle intercept processing unless it is desired to have forwarding processor 32 provide intercept processing for these packets.

Though forwarding processor 32 may forward the copy of the packet upon detecting interception to route processor 30 for transfer to an intercept receiver, it may be desirable to limit the functions of route processor 30 to the handling of configuration, network management functions, and route updates. Moreover, the volume/rate of traffic which may be sent from forwarding processor 32 to route processor 30 is smaller than the volume/rate of traffic which forwarding processor 32 can send and receive. Thus, having the forwarding processor copy and forward the copied packet to the intercept receiver will lessen the load of route processor 30. Forwarding processor 32 is still free to perform normal packet forwarding.

Thus, it is apparent that there has been provided, in accordance with the present invention, a system and method for intercepting packets in a pipeline network processor that satisfies the advantages set forth above. Although the present invention has been described in detail, it should be understood that various changes, substitutions, and alterations may be made herein. For example, though discussed in relation to a cable modem and cable ports, the present invention may equally be applicable in other packet distribution environments. Also, though discussed with respect to MAC address comparisons, the present invention may equally apply to the use of other addressing schemes including Internet Protocol addresses. Other examples may be readily ascertainable by those skilled in the art and may be made herein without departing from the spirit and scope of the present invention as defined by the following claims.

What is claimed is:

1. A method for intercepting packets in a pipeline network processor, comprising:
   receiving an information packet from an inbound port;
   determining an outbound port for the information packet;
   determining whether the outbound port has been identified for intercept processing;
   determining whether the destination has been identified for intercept processing in response to the outbound port being identified for intercept processing;
   making a copy of the information packet in response to the destination being identified for intercept processing.

2. The method of claim 1, further comprising:
   placing an identity of a destination into the information packet for subsequent determination of intercept processing.

3. The method of claim 1 further comprising:
   forwarding the copy of the information packet to an intercept receiver.

4. The method of claim 1, further comprising:
   forwarding the information packet to the destination through the destination port.

5. The method of claim 1, further comprising:
   forwarding the copy of the information packet to a routing processor for destination routing.

6. The method of claim 1, further comprising:
   comparing the destination to a list of reference destinations desired for interception.

7. The method of claim 6, wherein the destination is individually compared to each reference destination with a match is found.

8. The method of claim 7, further comprising:
   forwarding the information packet to the destination without copying in response to the destination not matching any of the reference destinations.

9. The method of claim 8, further comprising:
   comparing the source to a list of reference sources in order to determine whether the source has been identified for intercept processing.

10. The method of claim 1, further comprising:
    determining whether the inbound port has been identified for intercept processing;
    determining whether a source of the information packet has been identified for intercept processing in response to the inbound port being identified for intercept processing;
    making a copy of the information packet in response to the source being identified for intercept processing.

11. A pipeline network processor implementing code for intercepting packets, the code comprising:
    a first set of instructions operable to receive and classify an information packet, the first set of instructions operable to determine whether an inbound port from which the information packet is received has been identified for intercept processing;
    a second set of instructions operable to determine an outbound port for routing of the information packet, the second set of instructions operable to determine whether the outbound port has been identified for intercept processing;
    a third set of instructions operable to determine whether the packet satisfies input access requirements, the third set of instructions operable to forward the information packet along an intercept path in response to the inbound port being identified for intercept processing, the third set of instructions operable to determine whether a source of the information packet has been identified for intercept processing upon feedback of the information packet on the intercept path, the third set of instructions operable to determine whether the information packet satisfies output access requirements, the third set of instructions operable to forward the information along the intercept path in response to the outbound port being identified for intercept processing, the third set of instructions operable to determine whether a destination of the information packet has been identified for intercept processing upon feedback of the information packet on the intercept path;
    a fourth set of instructions operable to set up feedback of the information packet on the intercept path, the fourth set of instructions operable to save appropriate bytes of the information packet to permit feedback processing of the information packet on the intercept path;
    a fifth set of instructions operable to place an address of the source of the information packet into a compare area of the information packet, the fifth set of instructions operable to determine an address for the destination of the information packet, the fifth set of instructions operable to place the address of the destination into a compare area of the information packet;
    a sixth set of instructions operable to feedback the information to the first set of instructions on the intercept path.

12. The pipeline network processor of claim 11, wherein the third set of instructions is operable to construct a copy of the information packet upon feedback of the information packet on the intercept path in response to either the address of the source or the address of the destination being identified for intercept processing.

13. The pipeline network processor of claim 11, wherein the address of the source and the address of the destination are compared to a configured list of intercept addresses in order to determine whether the information packet is to be intercepted.

14. The pipeline network processor of claim 11, wherein the sixth set of instructions is operable to forward the information packet to the destination upon completion of intercept processing.

15. The pipeline network processor of claim 11, wherein the fifth set of instructions determines the address of the destination from a re-encapsulated Layer 2 header associated with the information packet.

16. A system for intercepting packets, comprising:
    a packet interface operable to receive an information packet from a source at an inbound port;
    a pipeline network processor operable to forward the information packet to a destination through an outbound port, the pipeline network processor including a plurality of processing columns operable to determine a destination for the information packet, the plurality of processing columns operable to determine whether the source, the inbound port, the outbound port, and the destination are identified for intercept processing, the plurality of processing columns operable to build a copy of the packet in response to the source, the inbound port, the outbound port, or the destination for the information packet being identified for intercept processing;

a route processor operable to configure the pipeline network processor for intercept processing.

17. The system of claim 16, wherein the plurality of processing columns are configured to compare an address for the source and the destination to a configured list of intercept addresses.

18. The system of claim 16, wherein the pipeline network processor is operable to route the copy of the information packet to the route processor for forwarding to an intercept receiver in response to either the source or destination being identified for intercept processing.

19. The system of claim 16, wherein the pipeline processor is operable to forward the copy of the information packet to an intercept receiver in response to the source or destination being identified for intercept processing.

20. The system of claim 16, wherein the pipeline network processor forwards the information packet to the destination.

21. A system for intercepting packets in a pipeline network processor, comprising:

means for receiving an information packet from an inbound port;

means for determining an outbound port for the information packet;

means for determining whether the outbound port has been identified for intercept processing;

means for determining whether the destination has been identified for intercept processing in response to the outbound port being identified for intercept processing;

means for making a copy of the information packet in response to the destination being identified for intercept processing.

* * * * *